United States Patent
Fetzer et al.

(10) Patent No.: US 10,625,598 B2
(45) Date of Patent: Apr. 21, 2020

(54) FUEL TANK DEVICE

(71) Applicant: MAGNA STEYR Fuel Systems GmbH Werk Schwaebisch Gmuend, Schwaebisch Gmuend (DE)

(72) Inventors: Horst Fetzer, Eislingen (DE); Steffen Zanek, Schwaebisch Gmuend (DE)

(73) Assignee: MAGNA STEYR FUEL SYSTEMS GSMBH WERK SCHWÄBISCH GMÜND, Schwäbisch Gmünd (DE)

( * ) Notice: Subject to any disclaimer, the term of this patent is extended or adjusted under 35 U.S.C. 154(b) by 140 days.

(21) Appl. No.: 15/856,687

(22) Filed: Dec. 28, 2017

(65) Prior Publication Data

US 2018/0194221 A1 Jul. 12, 2018

(30) Foreign Application Priority Data

Jan. 10, 2017 (EP) ..................... 17150785
Dec. 5, 2017 (EP) ..................... 17205491

(51) Int. Cl.
*B60K 15/03* (2006.01)
*B60K 15/04* (2006.01)
*B60K 15/05* (2006.01)
*B60K 15/035* (2006.01)

(52) U.S. Cl.
CPC ........ *B60K 15/03006* (2013.01); *B60K 15/03* (2013.01); *B60K 15/035* (2013.01); *B60K 15/0403* (2013.01); *B60K 15/0406* (2013.01); *B60K 15/05* (2013.01); *B60K 2015/03019* (2013.01); *B60K 2015/0346* (2013.01); *B60K 2015/0348* (2013.01); *B60K 2015/03105* (2013.01); *B60K 2015/03118* (2013.01); *B60K 2015/03164* (2013.01); *B60K 2015/03217* (2013.01); *B60K 2015/03289* (2013.01); *B60K 2015/03328* (2013.01); *B60K 2015/03434* (2013.01); *B60K 2015/0477* (2013.01); *B60Y 2200/14* (2013.01)

(58) Field of Classification Search
CPC ........ B60K 15/03006; F02M 37/0082; F02M 37/0094; F02M 37/103; F02M 37/106
USPC ....................................... 220/562
See application file for complete search history.

(56) References Cited

U.S. PATENT DOCUMENTS

| 4,518,009 | A | 5/1985 | Schiemann | |
|---|---|---|---|---|
| 6,978,802 | B2 * | 12/2005 | Hagano | B29C 49/20 137/560 |
| 2001/0013516 | A1 * | 8/2001 | Boecker | B29C 49/20 220/562 |

(Continued)

FOREIGN PATENT DOCUMENTS

| DE | 3225351 A1 | 1/1984 |
|---|---|---|
| DE | 102007040416 A1 | 10/2008 |

(Continued)

*Primary Examiner* — Shawn M Braden
(74) *Attorney, Agent, or Firm* — Jordan IP Law, LLC; Todd A. Vaughn

(57) ABSTRACT

A fuel tank apparatus for a motor vehicle that includes a fuel tank and a filling module configured for connection to the fuel tank. The filling module includes a fuel accumulator and a filler neck configured for fluidic connection to the fuel accumulator in such a way that permits filling to occur place via the filler neck exclusively into the fuel accumulator.

18 Claims, 4 Drawing Sheets

(56) References Cited

U.S. PATENT DOCUMENTS

2002/0043536 A1* 4/2002 Huse .................. B29C 49/20
                                                    220/562
2004/0129708 A1* 7/2004 Borchert ............ B29C 49/20
                                                    220/562
2008/0000916 A1* 1/2008 Hwang ................ E02F 9/00
                                                    220/562

FOREIGN PATENT DOCUMENTS

| DE | 102010043644 A1 | 5/2012 |
| DE | 102013020784 A1 | 5/2014 |
| EP | 0976602 A2 | 2/2000 |
| EP | 2832572 A1 | 2/2015 |
| JP | H09226389 A | 9/1997 |

* cited by examiner

FUEL TANK DEVICE

CROSS-REFERENCE TO RELATED APPLICATIONS

The present application claims priority under 35 U.S.C. § 119 to European Patent Application Nos. EP 17150785.8 (filed on Jan. 10, 2017) and EP 17205491.8 (filed on Dec. 5, 2017), which are each hereby incorporated by reference in their respective complete entireties.

TECHNICAL FIELD

Embodiments relates to a fuel tank apparatus for a motor vehicle, and to a method for producing a fuel tank apparatus of this type.

BACKGROUND

Motor vehicles which are operated using fuel customarily use a fuel tank, particularly, a petrol or diesel tank, for carrying the required fuel. Various additions have been installed in the meantime into fuel tanks of this type to increase the functionality of the fuel tank, for example fuel delivery pumps, ventilation valves, filling level sensors, surge pots, intake lines, etc.

The installation of additional components of this type into a fuel tank is often difficult, since it should take place in a narrow space, for example through assembly openings, and suitable fasteners have to be provided on the fuel vessel.

In addition, the utilization of small fuel quantities in a fuel tank, which small fuel quantities may occur, for example, during initial filling after assembly of the vehicle or in the case of a low tank filling level during uphill and downhill driving, is difficult, since the fuel is distributed in the entire fuel tank which may be configured to be very large and with a complex shape, particularly, in the case of tanks for lorries.

SUMMARY

Embodiments relate to an enhanced fuel tank apparatus for a motor vehicle, and particularly, to a fuel tank apparatus which efficiently utilizes small fuel quantities in the fuel tank, and in the process, may be produced simply.

Embodiments relate to a simple method for producing a fuel tank apparatus of the type disclosed herein.

In accordance with embodiments, a fuel tank apparatus for a motor vehicle, comprises: a fuel tank, and a filling module configured for insertion into the fuel tank or for placement onto the fuel tank for fastening to the fuel tank. The filling module comprises a fuel accumulator and a filler neck configured for fluidic connection to the fuel accumulator in such a way that filling takes place via the filler neck exclusively into the fuel accumulator.

In accordance with embodiments, the fuel tank does not have an additional filler neck so that filling of the fuel tank takes place exclusively via the fuel accumulator of the filling module.

In accordance with embodiments, a second fuel accumulator may be used which is smaller in size in comparison to the fuel tank. The second fuel accumulator is configured for insertion into the larger fuel tank and for placement onto the fuel tank from the outside. The second fuel accumulator is already configured with necessary additional components before the installation into the fuel tank or before the attachment. In order that the second fuel accumulator performs a function of an efficient residual quantity vessel in the fuel tank, it is ensured that the fuel passes exclusively, particularly directly and immediately, into the fuel accumulator during filling of the motor vehicle and therefore of the fuel tank. The filling module which is already prefabricated outside the fuel tank, therefore comprises a filler neck for filling the fuel accumulator of the filling module.

In accordance with embodiments, the filler neck may be arranged directly on the fuel accumulator, particularly as a collar of the fuel accumulator. The filler neck may then reach through a prepared opening of the fuel tank.

In accordance with embodiments, the filler neck may be arranged on a covering element of the filling module, the covering element being placed onto the fuel tank from the outside. The filler neck may then protrude, particularly, into an opening of the fuel accumulator and/or into a collar of the fuel accumulator.

In accordance with embodiments, the filling module and/or the covering element may comprise a filler cap for closing the filler neck.

In accordance with embodiments, the filling module, particularly the filler neck or the collar, may also comprise an anti-theft protection device against the theft of fuel.

In accordance with embodiments, one or more connecting openings and/or connecting valves is/are may be arranged on the fuel accumulator, with the result that filling of the fuel tank may take place via the connecting opening and/or the connecting valve of the fuel accumulator. The valve may be set up to open the connecting opening between the fuel accumulator and the fuel tank when there is fuel at the valve, in the fuel accumulator, and to close the connecting opening when there is no fuel.

In accordance with embodiments, at least one float valve may be arranged in the fuel tank, outside the fuel accumulator, which float valve is set up in such a way that the float valve opens a fluid connection to the fuel accumulator when it is surrounded by fuel, and that the float valve closes the fluid connection to the fuel accumulator when it is not surrounded by fuel.

In accordance with embodiments, the fuel accumulator, and therefore the filling module, may have at least one vacuum line opening into the fuel tank. Fuel may be sucked into the fuel accumulator from the orifice end of the vacuum line in the fuel tank, which orifice end may also be equipped with a float valve.

In accordance with embodiments, the filling module may have a filling level sensor for measuring the filling level in the fuel tank.

In accordance with embodiments, the filling module may have a fuel pump for conveying the fuel out of the fuel accumulator.

In accordance with embodiments, the filling module may also have forward feed and return lines to an engine of the motor vehicle. The forward feed and return lines may be fastened, particularly, to the covering element.

In accordance with embodiments, the filling module may have a pressure equalization valve and/or ventilation device.

In accordance with embodiments, the filling module may have a water separator.

In accordance with embodiments, the fuel tank may serve as the main tank of a lorry, particularly, the main tank of a saddle tank of a lorry.

In accordance with embodiments, a method for producing a fuel tank apparatus may comprise at least one of: assembling a filling module which may (or may not) include a filler neck; inserting the assembled filling module into the fuel tank and fastening the inserted fuel module to the fuel tank. Subsequently, the filler neck may be fluidically connected to the fuel accumulator if it has not already been mounted on the fuel accumulator before the fastening thereof.

In accordance with embodiments, filling of the fuel tank then takes place exclusively via the filler neck which at the same time acts as a filler neck for direct filling of the fuel accumulator and as a filler neck for indirect filling of the fuel tank.

DRAWINGS

Embodiments will be illustrated by way of example in the drawings and explained in the description below FIG. 1 illustrates a sectional view of a fuel tank apparatus during the production thereof, in accordance with embodiments.

DESCRIPTION

Figure 1:
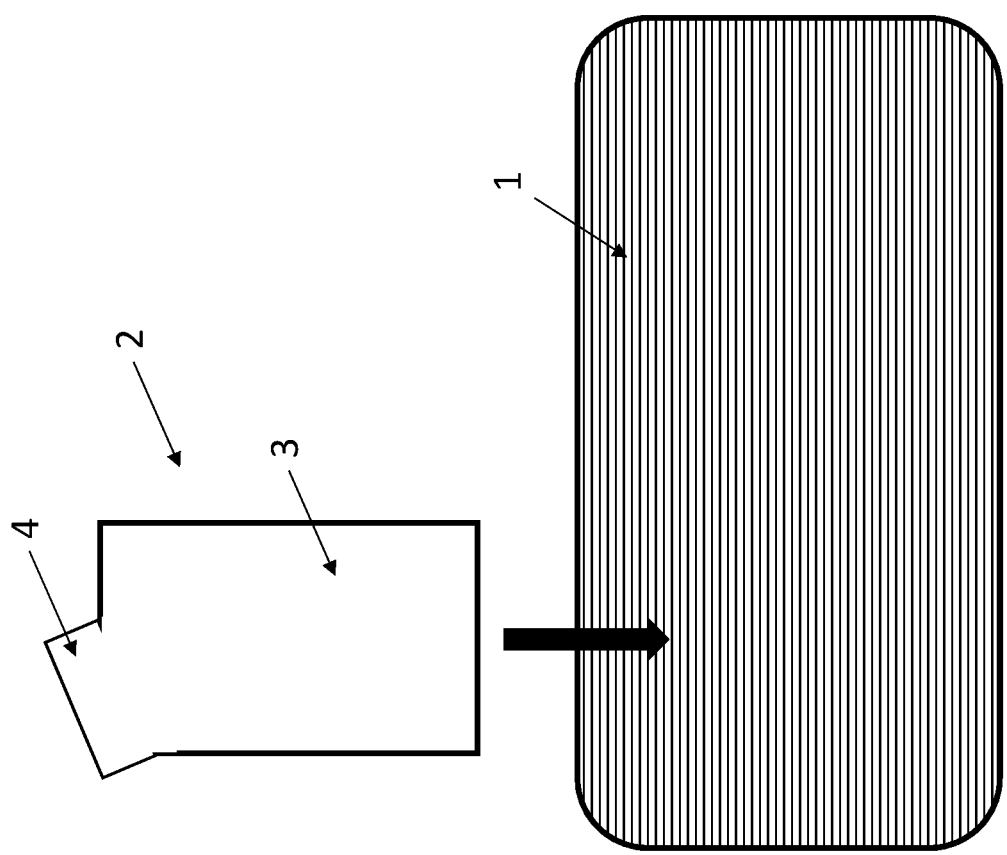

FIG. 1 illustrates a fuel tank apparatus during production thereof, the fuel tank apparatus comprising a fuel tank 1 and a filling module 2. The filling module 2 is at least mostly assembled before being inserted and fastened in the fuel tank 1, and is subsequently inserted into the fuel tank 1 (in the arrow direction which is illustrated in FIG. 1) and is fastened to the fuel tank 1. The fuel tank 1 has, for example, an assembly opening for inserting the filling module 2, or comprises during the insertion, for example, only a half shell, onto which a second half shell is welded or screwed or adhesively bonded only after the insertion of the filling module 2.

Figure 2:
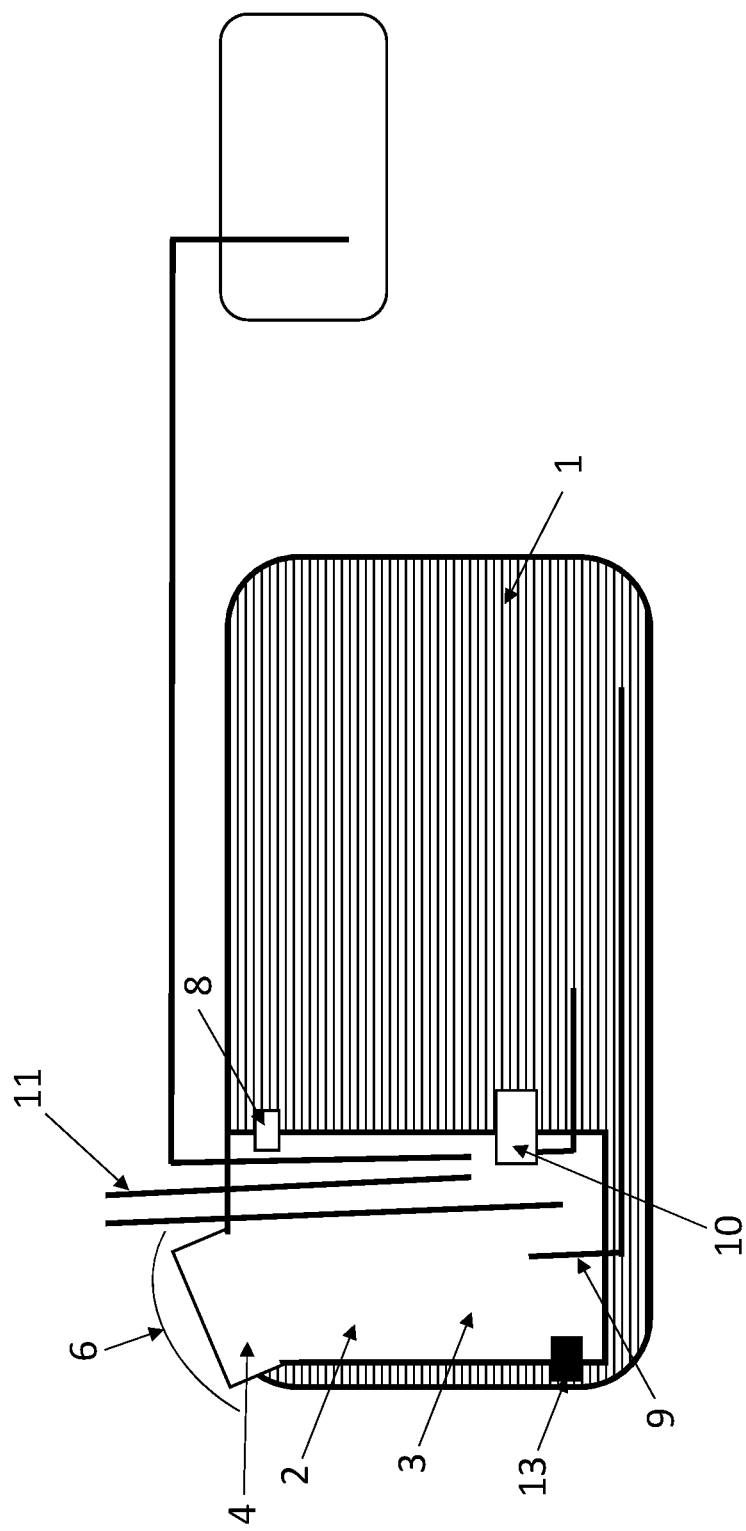
FIG. 2 illustrates a sectional view of a fuel tank apparatus, in accordance with embodiments.
Figure 3:
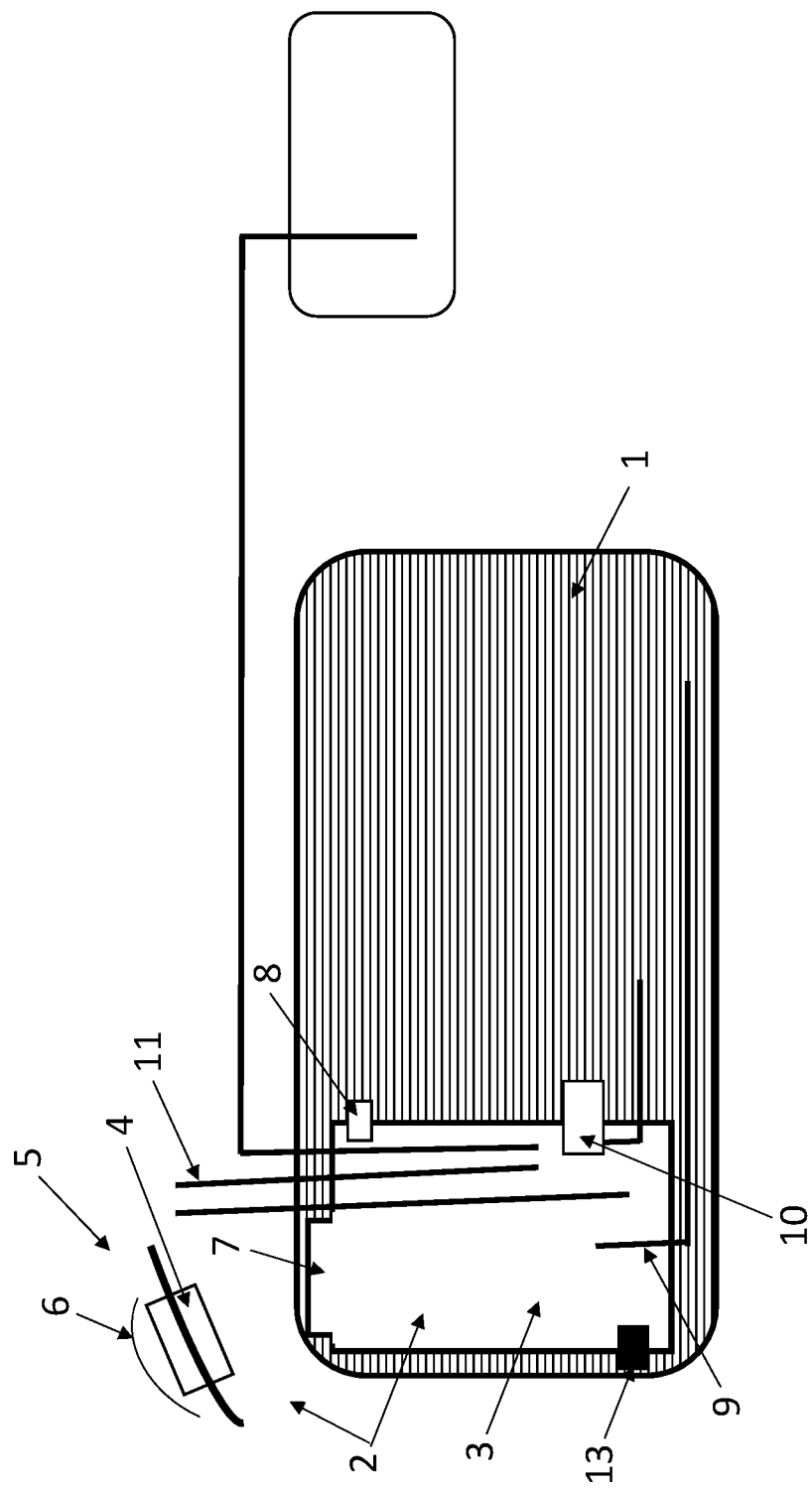
FIG. 3 illustrates a sectional view of a fuel tank apparatus, in accordance with embodiments.

As illustrated in FIGS. 1 and 2, the fuel accumulator 3 may have an integrated filler neck 4, or the filler neck 4 may already be connected to the fuel accumulator 3 before the insertion of the fuel accumulator 3. Otherwise, as illustrated in FIG. 3, a filler neck 4 may also be connected to the fuel accumulator 3 after the insertion.

FIG. 2 illustrates further details of the fuel tank apparatus in accordance with embodiments, and includes at least one or a plurality of connecting openings 8 which are arranged on the fuel accumulator 3. Particularly, the connecting openings 8 may be arranged in the boundary wall which delimits the fuel accumulator 3 towards the fuel tank 1, and which are set up to make filling of the fuel tank 1 possible via the connecting opening 8.

If the fuel level in the fuel accumulator 3 reaches the level of the connecting opening 8 during filling of the fuel accumulator 3 via the filler neck 4, or during filling of the fuel accumulator 3 via a return line 11, the fuel may then flow over into the fuel tank 1.

The filling module 2 comprises at least one forward feed and return line 11, for conducting the fuel out of the fuel accumulator 3 to and from an engine of the motor vehicle. The filling module 2 may have a fuel pump for conveying the fuel. The return line 11 is arranged in such a way that fuel which flows back always passes into the fuel accumulator 3.

The fuel tank apparatus has a float valve 13 in the fuel tank 1, which float valve 13 is to open a fluid connection to the fuel accumulator 3 when the float valve 13 in the fuel tank 1 is surrounded by fuel, and close the fluid connection when no fuel prevails at the float valve 13. When the float valve 13 is open, fuel may be removed from the fuel tank 1 via the float valve 13. When the float valve 13 is closed because no fuel is available in the fuel tank 1 at the float valve 13, a supply of fuel takes place merely from the fuel accumulator 3.

The float valve 13 may be formed by way of an assembly which comprises: the float valve 13, arranged in the fuel tank 1 outside the fuel accumulator 3, a T-piece adjoining it, and a vacuum valve, particularly spring valve, adjoining it in the fuel accumulator 3. The T-piece which is situated between the spring valve, i.e., the vacuum valve, and the float valve 13 may be connected directly to the forward feed line, particularly the diesel forward feed line.

When the float valve 13 is closed, a vacuum is produced in the forward feed line, and the vacuum valve, i.e., the spring valve, opens. The supply of fuel then takes place via the fuel accumulator 3. When the float valve 13 is open, the supply of fuel takes place via the float valve 13 in the fuel tank 1. The spring valve is then closed. No supply takes place via the fuel accumulator.

The fuel accumulator 3 may additionally have a plurality of vacuum lines 9 which open into the fuel tank 1, with the result that fuel may be sucked out of the fuel tank 1 into the fuel accumulator 3. Float valves may likewise be arranged at the free ends of the vacuum lines 9.

The filling module 2 additionally has a filling level sensor 10, for example, a toggle lever encoder, for measuring the filling level in the fuel tank 1. The filling module 2 may have a pressure equalization valve and/or ventilation device. The filling module 2 may likewise have a water separator.

The filling module 2 comprises a filler cap 6 for closing the filler neck 4. The filling module 2 may also comprise an anti-theft protection device for the fuel.

As illustrated in FIGS. 2 and 3, the fuel tank 1 may comprise a main tank of a saddle tank of a lorry, the saddle tank having an additional tank 12 in addition to the main tank.

FIG. 3 illustrates an embodiment of a fuel tank apparatus in which a covering element 5 of the filling module 2 is subsequently placed onto the remaining parts of the filling module 2, particularly onto the fuel accumulator 3. The filler neck 4 which is accessible from the outside is configured on the covering element 5 of the filling module 2. The covering element 5 is placed onto the fuel tank 1 from the outside and is fastened to the said fuel tank 1. The filler neck 4 may be inserted into a collar 7 of the fuel accumulator 3, with the result that the filler neck and the fuel accumulator are connected directly in a fluid-conducting manner, and the entire fuel passes directly into the fuel accumulator 3.

Figure 4:
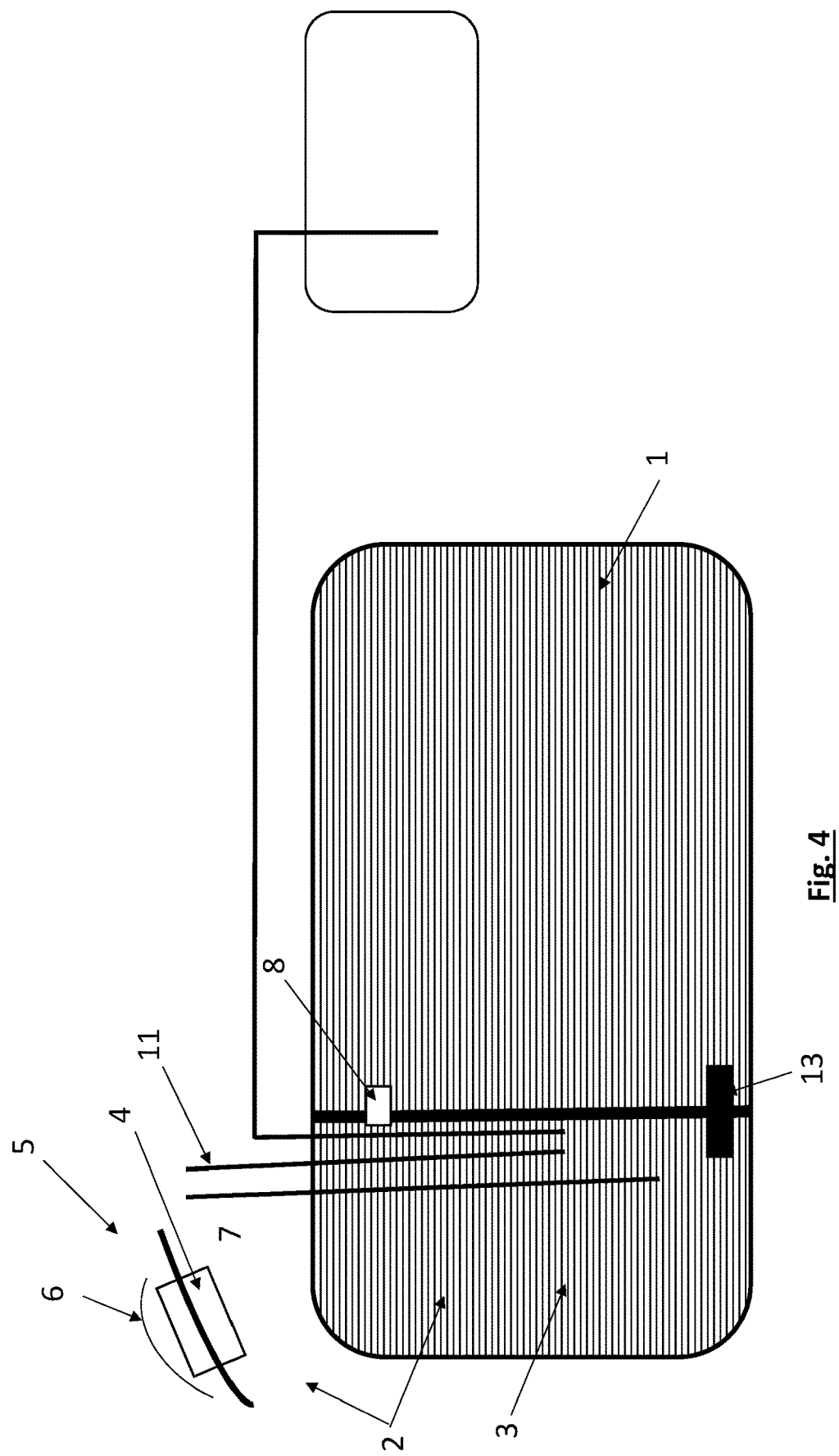
FIG. 4 illustrates a sectional view of a fuel tank apparatus, in accordance with embodiments.

As illustrated in FIG. 4, an embodiment of a fuel tank apparatus differs from the embodiments of FIGS. 1 through 3 in that the filling module 2, particularly the fuel accumulator 3, is attached here to a wall of the fuel tank 1 and is fastened to the fuel tank 1 on the outside. The fastening of the filling module 2 may take place, particularly, by way of an orbital weld which runs around on the outside, with the formation of an orbital seam 14, or, for example, as an adhesive bond.

The walls of the fuel accumulator 3 and the fuel tank 1, in the region of the orbital seam 14, may together act as a metallic dividing wall between fuel accumulator 3 and fuel tank 1.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first,"

"second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SYMBOLS

1 Fuel tank
2 Filling module
3 Fuel accumulator
4 Filler neck
5 Covering element
6 Filler cap
7 Collar
8 Connection opening
9 Vacuum line
10 Filling level sensor
11 Forward feed and return lines
12 Additional tank
13 Float valve
14 Orbital seam

What is claimed is:

1. A fuel tank apparatus for a motor vehicle, comprising:
a fuel tank; and
a filling module configured for receipt into the fuel tank, the filling module including a fuel accumulator and a covering element configured for placement on and attachment to the fuel tank from an area outside of the fuel tank, the covering element including:
a filler neck configured for fluidic connection to the fuel accumulator to permit a filling sequence to occur, via the filler neck, exclusively into the fuel accumulator, and
a filler cap configured to close access to the filler neck from the area outside of the fuel tank.

2. The fuel tank apparatus of claim 1, wherein the fuel tank does not include an additional filler neck, to permit the filling sequence to occur exclusively via the fuel accumulator.

3. The fuel tank apparatus of claim 1, wherein the filler neck is configured to protrude into a collar of the fuel accumulator.

4. The fuel tank apparatus of claim 1, further comprising at least one connecting opening arranged at an interface between the fuel tank and the fuel accumulator to permit filling of the fuel tank via the fuel accumulator.

5. The fuel tank apparatus of claim 1, further comprising at least one float valve arranged in the fuel tank, and configured to:
open a fluid connection between the fuel tank and the fuel accumulator when surrounded by fuel, and
close the fluid between the fuel tank and the fuel accumulator when not surrounded by fuel.

6. The fuel tank apparatus of claim 5, further comprising an assembly that includes the float valve and a forward feed and return line to an engine of the motor vehicle.

7. The fuel tank apparatus of claim 1, wherein the fuel accumulator is configured for attachment to a wall of the fuel tank.

8. The fuel tank apparatus of claim 1, wherein the fuel accumulator comprises at least one vacuum line configured to open into the fuel tank.

9. The fuel tank apparatus of claim 1, wherein the filling module comprises a filling level sensor configured to measure a filling level of fuel in the fuel tank.

10. The fuel tank apparatus of claim 1, wherein the filling module comprises a fuel pump configured to convey the fuel from the fuel accumulator to an engine of the motor vehicle and also from the engine of the motor vehicle.

11. The fuel tank apparatus of claim 1, wherein the filling module comprises a pressure equalization valve and/or a ventilation device.

12. The fuel tank apparatus of claim 1, wherein the filling module comprises a water separator.

13. The fuel tank apparatus of claim 1, wherein the fuel tank comprises a main tank of a saddle tank of a lorry.

14. A method for producing a fuel tank apparatus for a motor vehicle, the method comprising:
assembling a filling module including a fuel accumulator and a filler neck configured for fluidic connection to the fuel accumulator to permit a filling sequence to occur via the filler neck exclusively into the fuel accumulator;
inserting the assembled filling module into a fuel tank; and
closing access to the filler neck from an area outside of the fuel tank, via a covering element that includes a filler neck configured for fluidic connection to the fuel accumulator to permit a filling sequence to occur via the filler neck exclusively into the fuel accumulator, and a filler cap configured to close access to the filler neck from the area outside of the fuel tank.

15. A fuel tank apparatus for a motor vehicle, comprising:
a fuel tank; and
a filling module including a fuel accumulator configured for receipt into the fuel tank, and a covering element configured for placement on and attachment to the fuel tank from an area outside of the fuel tank, the covering element including:
a filler neck configured for fluidic connection to the fuel accumulator to permit a filling sequence to occur via the filler neck exclusively into the fuel accumulator, and
a filler cap configured to close access to the filler neck from the area outside of the fuel tank.

16. The fuel tank apparatus of claim 15, further comprising at least one connecting opening arranged at an interface between the fuel tank and the fuel accumulator to permit filling of the fuel tank via the fuel accumulator.

17. The fuel tank apparatus of claim 15, further comprising at least one float valve arranged in the fuel tank, and configured to:
open a fluid connection between the fuel tank and the fuel accumulator when surrounded by fuel, and
close the fluid between the fuel tank and the fuel accumulator when not surrounded by fuel.

18. The fuel tank apparatus of claim 15, wherein the fuel accumulator comprises at least one vacuum line configured to open into the fuel tank.

* * * * *